United States Patent [19]
Gandolfo

[11] Patent Number: 5,319,697
[45] Date of Patent: Jun. 7, 1994

[54] IMAGER APPARATUS TRANSPORT SYSTEM

[75] Inventor: Rino Gandolfo, Roccavignale, Italy

[73] Assignee: Minnesota Mining and Manufacturing Company, St. Paul, Minn.

[21] Appl. No.: 17,246

[22] Filed: Feb. 12, 1993

[30] Foreign Application Priority Data

Mar. 27, 1992 [IT] Italy .............................. MI92A000727

[51] Int. Cl.⁵ .............................................. G03B 42/02
[52] U.S. Cl. ..................................... 378/173; 378/172; 378/174
[58] Field of Search ................. 378/173, 167, 172, 174

[56] References Cited

U.S. PATENT DOCUMENTS 3,862,426  1/1975  Thomas .................................. 378/172
4,082,956  4/1978  Vepy ...................................... 378/173

FOREIGN PATENT DOCUMENTS 0252297  1/1988  European Pat. Off. .
WO91/08511  6/1991  PCT Int'l Appl. .

Primary Examiner—David P. Porta
Attorney, Agent, or Firm—Gary L. Griswold; Walter N. Kirn; Charles D. Levine

[57] ABSTRACT

An imager apparatus for exposing a film with recorded images includes an exposure site, a primary film path along which unexposed films are fed to the exposure site, a secondary film path along which exposed films are taken away from the exposure site, and a film driver at the exposure site. The film driver drives films between the primary and the secondary film paths. The film driver includes at least a pair of cooperating driving wheels on opposite faces along only one side edge of the film to eliminate transmission rods.

7 Claims, 3 Drawing Sheets

IMAGER APPARATUS TRANSPORT SYSTEM

FIELD OF THE INVENTION

The present invention relates to an imager apparatus in which images are ttansferred from an electronic recording medium to a photographic film.

BACKGROUND OF THE INVENTION

Imager apparatus are normally used in digital radiography to allow a physician to examine digitally recorded images in a traditional manner by viewing a transparency rather than a computer display. These apparatus can use electronic capabilities to process (by reducing, enlarging, zooming, etc.) and compose several images on the same photographic film. These apparatus are called multi-imagers.

These apparatus normally include a light tight casing which houses an image projector which projects the processed and composed images onto a photographic film resting at an exposure site on a glass plate, called focal plane. At the exposure site, film drivers ensure proper movement of the film. Components are also provided to transfer the film from a feeding magazine to the exposure site and from the exposure site to a receiving magazine.

There is a need for an imager apparatus with a simple and reliable film driver which does not interfere during film exposure and which is not an obstacle during removal of possible misfed films.

SUMMARY OF THE INVENTION

The present invention relates to an imager apparatus for exposing a film with recorded images. The imager apparatus includes an exposure site, a primary film path along which unexposed films are fed to the exposure site, a secondary film path along which exposed films are removed from the exposure site, and a film driver at the exposure site to drive film between the primary and the secondary film paths. The film driver includes at least a pair of cooperating driving wheels, acting on opposite faces along only one side edge of the film. Performing film driving on only one side edge of the film frees the entire exposing area from transmission rods or the like, which are otherwise necessary components of the driver when it acts on both opposing side edges.

Preferably, to better drive the film without any risk of backsliding, at least one of the driving wheels has a friction increasing liner, such as a rubber ring. Preferably, the apparatus includes two pairs of driving wheels, acting on the same side edge of the film. Preferably, the apparatus includes two parallel sliding grooves at the exposure site. The opposite side edges of the film slide within the grooves. One of the grooves is interrupted by the driving wheels to allow film driving. The grooves cooperate with the wheels to ensure smooth and faultless driving through the entire exposure site.

DETAILED DESCRIPTION OF PREFERRED EMBODIMENTS

Figure 1:
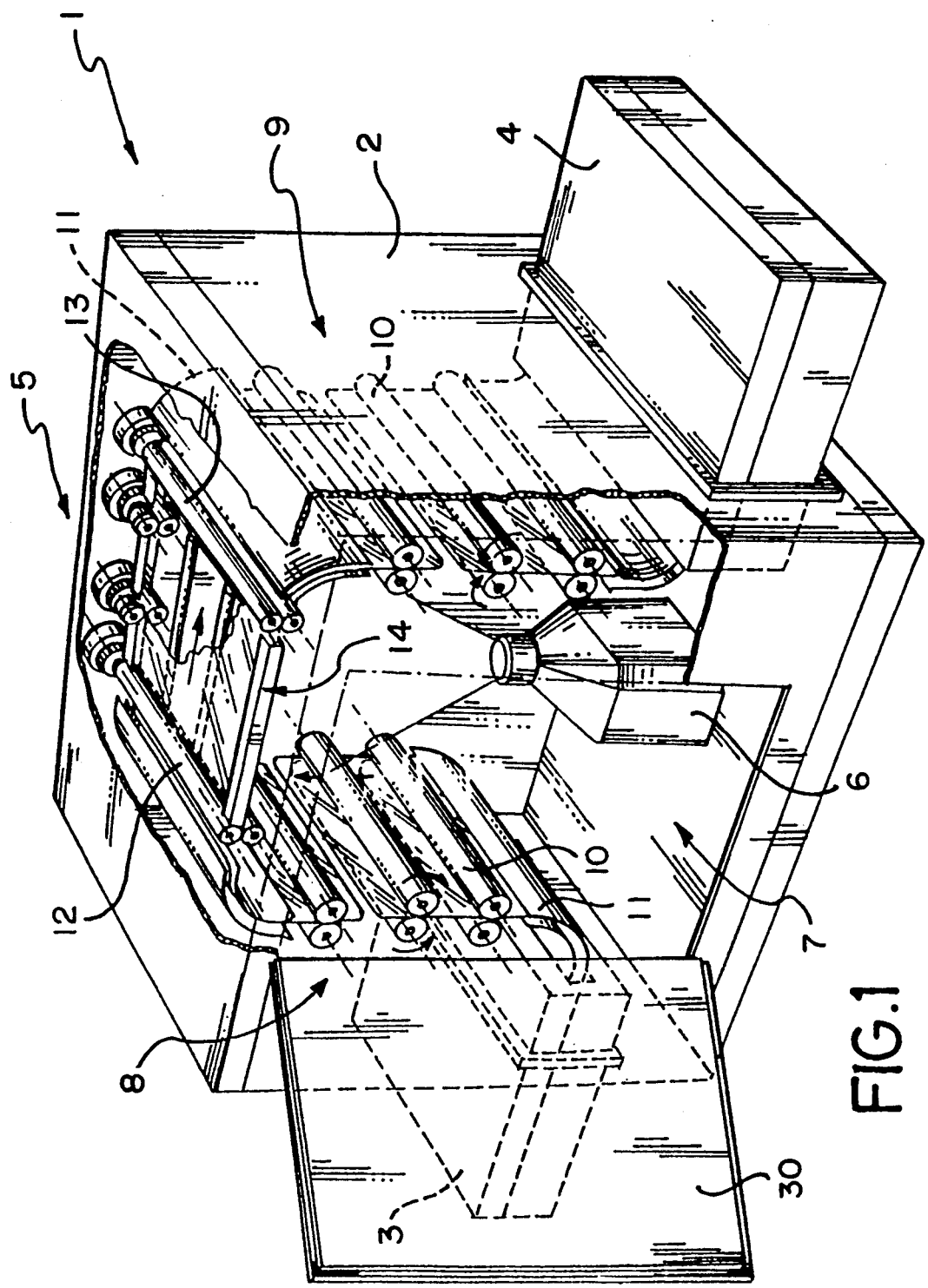
FIG. 1 is a perspective schematic view of an imager apparatus according to the present invention.
Figure 2:
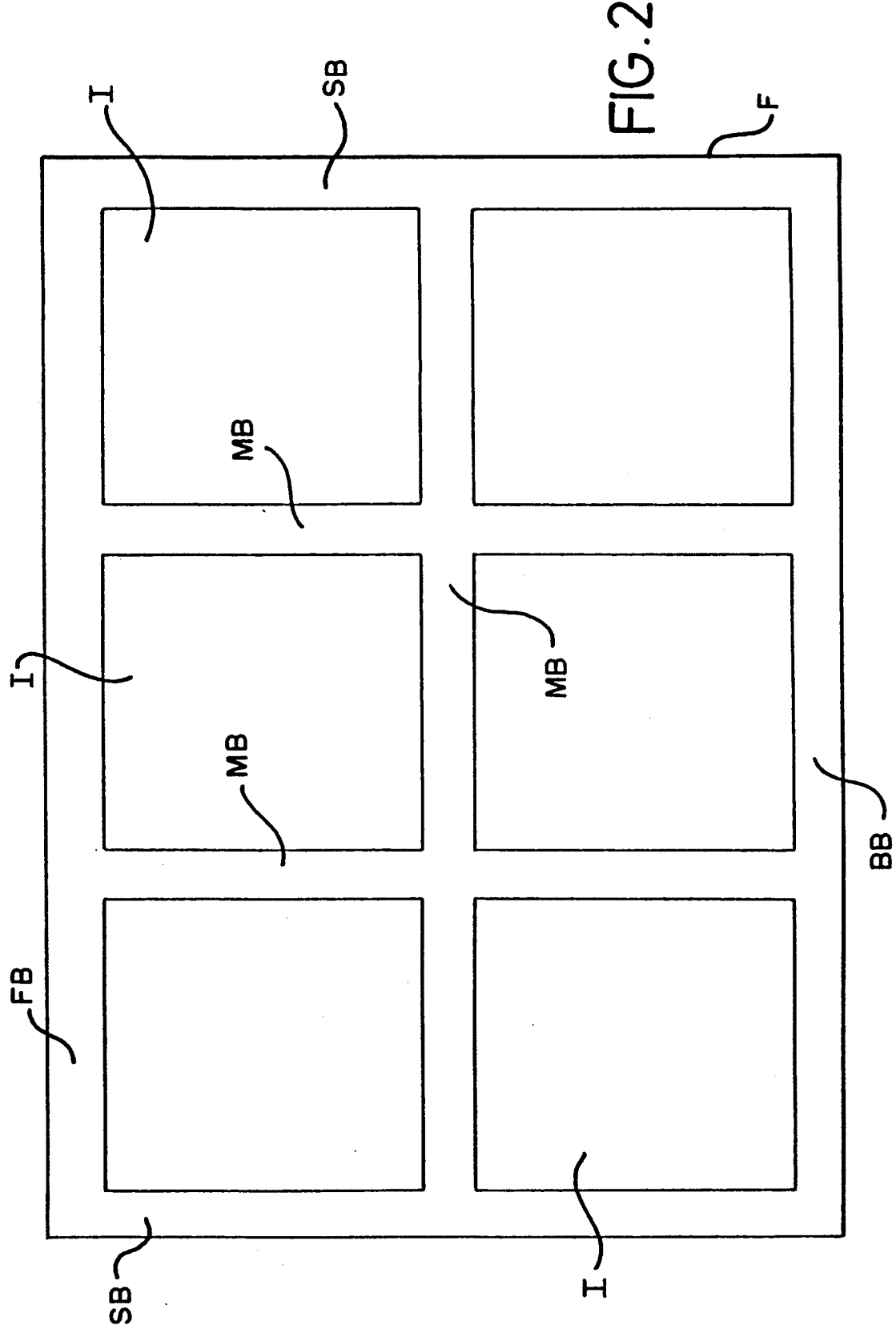
FIG. 2 is a plan view of a photographic film.

The imager apparatus I of the present invention can transfer six images onto the same photographic film. Upon exposure, six images areas I are defined on the film F, separated by middle border areas MB and surrounded by a back border area BB, a front border area FB, and two side border areas SB.

The imager apparatus 1 includes a light tight casing 2, which supports two magazines for the photographic films F. A feed magazine 3 for the unexposed films and a receiver magazine 4 for the exposed films are mounted in the light tight casing 2. The two magazines 3, 4 are light tight per se and are light tight when connected to the casing 2 in a conventional manner.

The casing 2 includes an exposure site 5 in the upper portion of the casing 2, and a projector 6, of any known type, in the lower portion of the casing 2. The projector 6 is positioned substantially opposite to the exposure site 5. An empty area 7 is formed within the casing 2 between the projector 6 and the exposure site 5.

A primary film path 8 extends between the feed magazine 3 and the exposure site 5. A secondary film path 9 extends between exposure site 5 and the receiver magazine 4. Each path 8, 9 is defined by pairs of rollers 10 and fixed bent guides 11.

An entry pair of rollers 12 is located on one side of the exposure site 5, and an exit pair of rollers 13 is located at the opposite side of the exposure site 5. The pairs of rollers 12, 13 are spaced by a film supporter such as a glass plate or an exposure grid 14, on which the film F rests during exposure.

Figure 3:
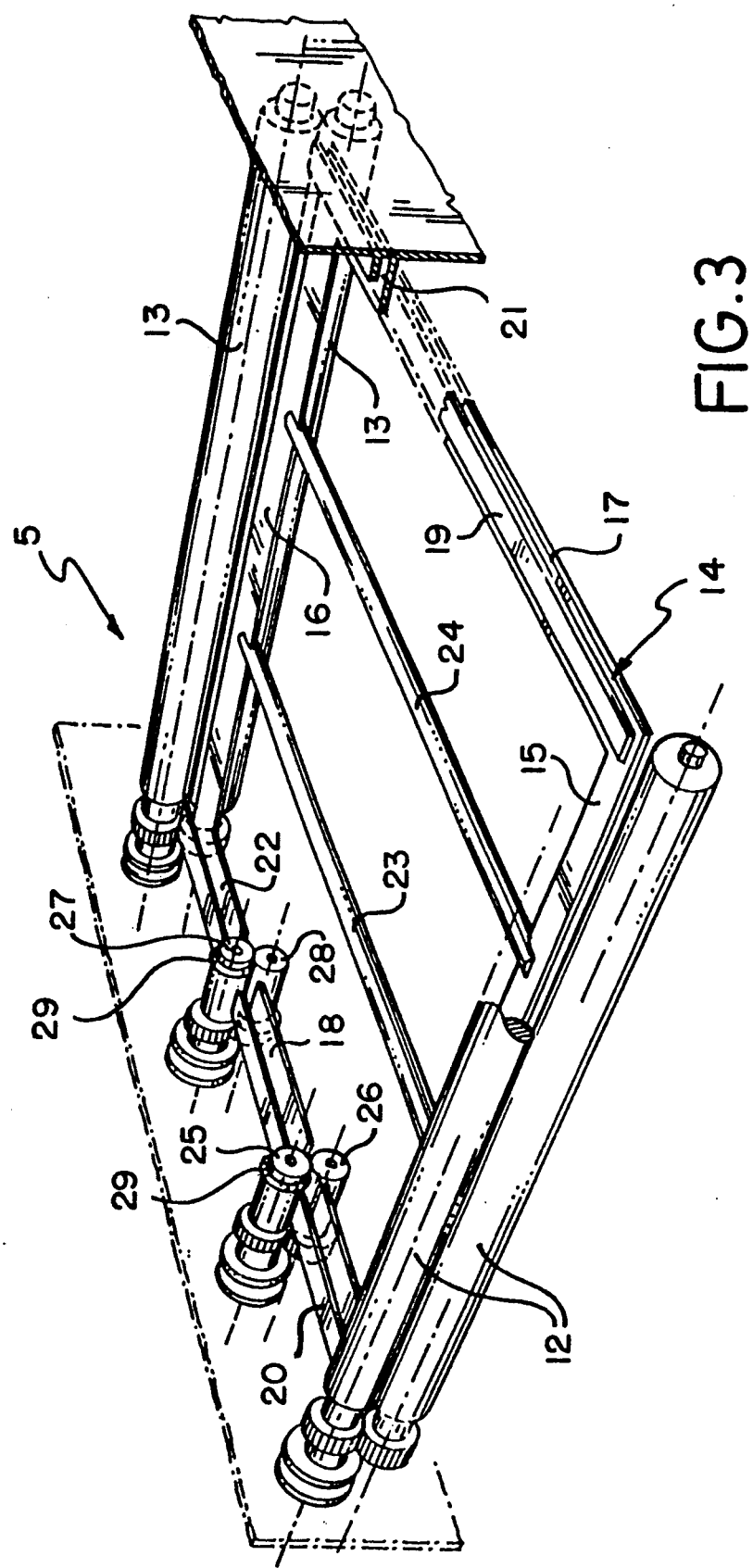
FIG. 3 is a perspective view of the exposure site of the apparatus of FIG. 1, in an enlarged scale.

As shown in FIG. 3, the exposure grid 14 includes a rectangular frame formed of two transverse bands 15, 16 and two longitudinal bands 17, 18. The frame is slightly smaller than the film F. Two upper bands 19, 20 are provided over and along the longitudinal bands 17, 18 and define sliding grooves 21, 22 between respective pairs of bands 17, 19, and 18, 20.

The exposure grid 14 also includes two rods 23, 24, fixed to and connecting the transverse bands 15, 16 of the frame. The rods 23, 24 each have a circular cross section and are parallel to each other and to the sliding direction of the film. The rods 23, 24 have a low friction surface which may be obtained either by finishing the rods themselves, or by placing a friction reducing liner on the rods.

A film driver, located at the exposure site 5, drives films F between the entry rollers 12 and the exit rollers 13. The film driver includes a first pair of driving wheels 25, 26 and a second pair of driving wheels 27, 28, which are located on the same side of the apparatus 1 to act on the same side border SB of the film F. The side border SB is slidingly engaged in the groove 22 between the bands 18, 20. The groove 22 is interrupted by the wheels 25, 26, 27, 28. The wheels 25, 26, 27, 28 and the rollers 10, 12, 13, are driven by a known driver (not shown).

Preferably, at least one wheel of each pair has a friction improving liner, such as a rubber ring 29. In the illustrated embodiment, the upper wheels 25, 27 have the rubber ring 29.

The casing 2 has a door 30, which provides access from below to the empty area 7 and the exposure site 5 inside of the casing 2.

In operation, a film F is carried from the feed magazine 3 along the primary path 8 by rollers 10 to the exposure site 5. The entry rollers 12 push the film F with its side borders SB into the grooves 21, 22. Both pairs of driving wheels 25, 26 and 27, 28 engage the film F while it is still driven by rollers 12, and transport the film to the proper exposure position. Smooth driving is ensured by grooves 21, 22 and by the rubber rings 29 on the wheels 25, 27.

During exposure, the film F rests on the exposure grid 14 and is held in place by only the wheels 25, 26, 27, 28 and the grooves 21, 22.

After exposure, the film F is moved from the exposure site 5 by the driving action of the wheels 25, 26, 27, 28, which push the film F into the pair of rollers 13. The film F is removed from the exposure site 5 and driven to the receiver magazine 4, along the secondary path 9, by rollers 10.

The use of drive wheels on only one side of the film F instead of on both sides allows the exposure site 5 to be completely free from any transmission rods or the like. This is particularly useful if a film is misfed or jams, since removal of the film is not impeded by transmission rods. Moreover, with this imager apparatus, the risk of having films damaged by unintended contact with transmission rods overlaying the exposure site is eliminated.

I claim:

1. An imager apparatus for exposing a film having first and second side edges with recorded images, the apparatus comprising an exposure site and film driving means located at the exposure site for driving film through the exposure site, characterized in that the film driving means comprises at least a pair of cooperating driving wheels acting on opposite faces along only the first side edge of the film, wherein the film is driven along the first side edge and the second side edge of the film is not driven through the exposure site.

2. The imager apparatus according to claim 1 wherein at least one of the driving wheels has a friction improving liner.

3. The imager apparatus according to claim 2 wherein the friction improving liner is a rubber ring.

4. The imager apparatus according to claim 1 wherein the film driving means comprises two pairs of driving wheels.

5. The imager apparatus according to claim 1 comprising two parallel sliding grooves at the exposure site, wherein each side edge of the film is slidingly engaged in a respective sliding groove, and wherein one of the grooves is interrupted by the pair of driving wheels to allow film driving.

6. An imager apparatus for exposing with recorded images a film having first and second side edges, the apparatus comprising:
    an exposure site;
    a film guide located at the exposure site for guiding the film through the exposure site, comprising first and second lower longitudinal bands, and first and second upper longitudinal bands, wherein the first lower and upper longitudinal bands define a first sliding groove and the second lower and upper longitudinal bands define a second sliding groove, and wherein the first side edge of the film is engaged in the first sliding groove and the second side edge of the film is engaged in the second sliding groove; and
    at least one pair of cooperating driving wheels acting on opposite faces and along only the first side edge of the film, wherein the driving wheels engage the first side edge of the film in the first sliding groove to drive the film along the first side edge while the film is not driven along the second side edge through the exposure site.

7. The imager apparatus of claim 6 wherein the driving wheels extend into the exposure site no more than the width of the first upper and lower longitudinal bands.

* * * * *